US012691427B2

(12) United States Patent
Voigt et al.

(10) Patent No.: US 12,691,427 B2
(45) Date of Patent: Jul. 28, 2026

(54) SYSTEM FOR SMALL-BATCH BRINE PRODUCTION

(71) Applicant: THE TORO COMPANY, Bloomington, MN (US)

(72) Inventors: David Voigt, Le Center, MN (US); Derek N. Meyer, Saint Peter, MN (US); Seth Ferkenstad, Mankato, MN (US)

(73) Assignee: THE TORO COMPANY, Bloomington, MN (US)

( * ) Notice: Subject to any disclaimer, the term of this patent is extended or adjusted under 35 U.S.C. 154(b) by 551 days.

(21) Appl. No.: 18/205,961

(22) Filed: Jun. 5, 2023

(65) Prior Publication Data

US 2023/0398509 A1      Dec. 14, 2023

Related U.S. Application Data

(60) Provisional application No. 63/351,156, filed on Jun. 10, 2022.

(51) Int. Cl.
*B01F 35/00*       (2022.01)
*B01F 25/312*       (2022.01)
(Continued)

(52) U.S. Cl.
CPC ...... *B01F 35/187* (2022.01); *B01F 25/31243* (2022.01); *B01F 35/42* (2022.01); *B01F 35/50* (2022.01); *C09K 3/185* (2013.01)

(58) Field of Classification Search
CPC ........ B01F 21/15; B01F 21/22; B01F 21/221; B01F 21/501; B01F 21/502; B01F 21/503;
(Continued)

(56) References Cited

U.S. PATENT DOCUMENTS

| | | | | |
|---|---|---|---|---|
| 5,384,102 A | * | 1/1995 | Ferguson .............. | B01F 21/221 210/97 |
| 10,766,010 B2 | * | 9/2020 | Nesheim ................ | C09K 3/185 |

(Continued)

*Primary Examiner* — Jennifer Wecker
*Assistant Examiner* — Brady C Pilsbury
(74) *Attorney, Agent, or Firm* — MARSHALL, GERSTEIN & BORUN LLP

(57) ABSTRACT

A system for mixing, for example, salt with water to make brine, includes a mixing vessel removably mounted within a bulk vessel. The mixing vessel is provided with a divider/filtration wall separating a front portion, where solid granular material is provided and mixes with a liquid for purposes of dissolving the solid granular material into the liquid, and a rear portion. The mixing vessel is provided with an agitation pipe along a floor thereof, and is shaped to minimize settled granular material from collecting at the base of the mixing vessel. The divider/filtration wall serves to prevent overflow, includes one or more screens to allow liquid, but prevent granular material larger than the pore size of the screens, to pass from the front portion to the rear portion, and in the event of overflow, minimize turbulence in material passing over the divider/filtration wall, all of which promote delivery of a uniform distribution of dissolved material to the batch tank. In the case of salt brine production, a wireless salinity sensor can accurately measure salt concentration in real time at a variety of depths.

11 Claims, 22 Drawing Sheets

(51) Int. Cl.
    B01F 35/42     (2022.01)
    B01F 35/50     (2022.01)
    C09K 3/18     (2006.01)

(58) Field of Classification Search
    CPC .............. B01F 21/504; Y10S 422/902; Y10T
                                          137/4891
    USPC .......................... 137/268; 422/264, 274, 277
    See application file for complete search history.

(56)                   References Cited

U.S. PATENT DOCUMENTS

2002/0030004 A1*   3/2002   Hammonds ........... B01F 25/316
                                              422/264
2012/0067968 A1*   3/2012   Brennan ........... B01F 25/31243
                                                 239/9
2019/0329191 A1*   10/2019   Hildreth .................. B01F 21/30

* cited by examiner

FIG. 14

Float Valve / Fresh Water Supply

Additive Induction

Pump Out / Truck Fill

Agitation / Making Salt Brine

SYSTEM FOR SMALL-BATCH BRINE PRODUCTION

CROSS-REFERENCE TO RELATED APPLICATION

The benefit under 35 U.S.C. § 119(e) of the filing date of U.S. Provisional Patent Application No. 63/351,156, filed Jun. 10, 2022, is claimed and the entire disclosure thereof is incorporated herein by reference.

FIELD OF THE DISCLOSURE

This disclosure relates generally to systems for bulk production of liquid ice abatement solutions and, more particularly, to systems for small-batch production of salt brine in a manner that achieves improved saturation by weight in a compact manner, while providing conveniences such as increased ease of cleaning.

BACKGROUND

Conventional salt brine-making plants typically operate by dissolving salt into water until a desired salinity of 23.3% saturation by weight, its eutectic point, is reached, at which point the plant is turned off, the brine pumped out, and then more brine (if desired) is made. Whether soaking or erosion methodologies are used, due to the tendency for salt to fail to dissolve into solution, it is often the case that a sludge or slurry of undissolved salt collects at the bottom of brine-making equipment, eventually becoming rock-hard, resulting in equipment down-time, delays in brine production, and laborious cleaning efforts.

Another shortcoming of conventional brine making equipment is the tendency for there to be a significant salinity gradient from top to bottom within the vessel in which the brine is being made. Whether the operator employs a manual hydrometer or electronic salinity sensor to test for salinity, the salinity gradient along any given water column can result in readings that are not representative of the true salinity, or readings would need to be taken at multiple depths and averaged, in an effort to assess when an average salinity of 23.3% saturation is reached.

Yet another shortcoming of conventional brine making operations is that the salt brine tends to atomize and become suspended in the air, which can cause operators to experience a salty taste. The atomized brine also has the potential to settle on and corrode bare metal surfaces in the vicinity.

It would be desirable to provide a system for producing brine that addresses these and other shortcomings in conventional brine-making plants.

SUMMARY OF THE DISCLOSURE

It is found that providing a mixing vessel, in which salt is dissolved in water in direct communication with a relatively larger batch vessel (also referred to herein as a bulk vessel), helps to achieve a eutectic salinity of 23.3% saturation by weight in a manner that can be measured consistently at a variety of depths. The mixing vessel is preferably made of stainless sheet metal and provided with a flat rectangular bottom, a front vertical wall, two side walls, and a sloped rear wall. The sloped rear wall extends upward to a vertical rear panel of the mixing vessel. A row of slots extends along the slanted rear wall of the mixing vessel to allow the solution to pass through the rear wall and into the batch vessel.

A divider/filtration wall extends upwardly from the sloped rear wall of the mixing vessel. The divider/filtration wall includes one or more sets of screens, the screens having a mesh size of, for example, ⅛" holes on ³⁄₁₆" centers, so as to prevent at least relatively large granules of salt from passing through the divider/filtration wall before the solution passes from the mixing vessel into the batch vessel. The divider/filtration wall also preferably has a serpentine cross-section, extending, for example, vertically upward from the sloped rear wall of the mixing vessel along a first extent of its height, then tilting rearwardly toward the sloped rear wall and vertical rear panel of the mixing vessel along a second extent of its height, then extending vertically, parallel to the vertical rear panel of the mixing vessel along a third extent of its height, and further has a fourth extent that is tilted forwardly, toward the front wall of the mixing vessel. The forwardly-tilted portion of the divider/filtration wall forms an overflow lip that impedes, but does not ultimately stop solution from spilling over the divider/filtration wall into a region of the mix vessel between the divider/filtration wall and the rear wall.

The shape of the divider/filtration wall is found to preserve a more laminar flow of solution across the divider/filtration wall as it flows to the region of the mixing vessel between the divider/filtration wall and the rear wall of the mixing vessel, even in the unlikely event the solution, such as due to a salt block, overflows past the overflow lip. A gentle waterfall effect is achieved by the shape of the divider/filtration wall. This is believed to contribute to lower expulsion of salt brine atomization during brine-making, as compared to conventional salt brine plants. When operating as intended, the divider/filtration wall, due to the mesh screen or screens provided therein, provide suitable filtration as the brine mixture passes from the forward mixing portion of the mixing vessel, across the divider/filtration wall, to the rear, filtered region of the mixing vessel, prior to pouring into the batch vessel. Relatively large debris such as undissolved salt granules are prevented from passing through the screens of the divider/filtration wall, and thereby do not enter the batch vessel.

The mixing vessel of the small-batch brine plant of the present disclosure is preferably removably mounted, such as by mounting brackets provided on exterior front and side walls of the mixing vessel, to an upper edge or lip of the batch vessel, such that a substantial portion of the mixing vessel lies within, and in operation, the mixing vessel is submerged in, the batch vessel during salt brine production. The mixing vessel and batch vessel effectively share the same liquid, providing a tank-within-a-tank, allowing the salt to be in constant contact with water, which helps begin the saturation process of salt granules and decreases mixing time. The mixing vessel may be manually removed from the batch vessel for cleaning, with any feed lines or hoses that communicate with the mixing vessel including quick-disconnect linkages to facilitate such removal.

A prevalent issue in the production of salt brine is the collection of undissolved salt that forms sediment or sludge at the base of the equipment. To address this concern, the mixing vessel is preferably provided with an agitation pipe that may extend substantially the length of the mixing vessel, from one sidewall to the other. The agitation pipe is preferably provided along a flat base of the mixing vessel, and is provided with a plurality of spaced nozzles or apertures, which may be directed toward the rear wall of the mixing vessel. Some or all of the nozzles or apertures of the agitation pipe may be directed horizontally toward the sloped portion at the base of the rear wall, or alternately, some or all the nozzles or apertures may be directed down at an angle. An agitation hose in communication with a water supply and main pump of the small-batch brine plant is connected to an inlet of the agitation pipe, which extends through one of the sidewalls of the mixing vessel.

An eductor nozzle is secured to an exterior of the rear wall of the mixing vessel, such as by a bracket or eductor nozzle holder, such that the eductor nozzle faces a bottom of the batch vessel in operation. The eductor nozzle works on a venturi principle, achieving a discharge flow rate several times the flow rate of liquid pumped into the eductor nozzle. Like the agitation pipe in the mixing vessel, the eductor nozzle helps to disperse clumps of undissolved salt that tends to settle at the bottom of the batch vessel, which serves to minimize the formation of sludge in the batch vessel. The eductor nozzle may also be fed by a hose or feed line in fluid communication with the water supply and main pump of the small-batch brine plant.

A common feed line is preferably used for both the agitation hose and the eductor nozzle system. Upon activation, both the eductor nozzle and the agitation pipe are active. This is desirable as it is found these components work in tandem with one another, providing disruption in both the mixing vessel and the batch vessel, which is found to contribute to a more homogenous solution in the batch vessel, helping ensure accurate salinity readings at different depths. Alternatively, if the agitation hose and eductor nozzle did not share a common feed line and valve control, separate controls could be provided to activate the eductor nozzle and the agitation pipe, but they should preferably, in operation, be activated simultaneously.

A suction manifold on an inlet side of a pump may be used to draw liquid from the batch vessel and recirculate the liquid back into the mixing vessel when making a solution, if the desired salinity (which may be measured via a wireless salinity sensor) has not yet been reached, and upon obtaining the desired salinity, the fluid valve control system may be manipulated to pump a desired volume of the produced brine mixture out to a storage vessel or to a truck. The manifold may be provided with a valve and connections facilitating introduction of additive materials from, for example, an additive supply tank of calcium chloride, magnesium chloride, or some other additive material, into the brine mixture, such as may be desired to reduce the freezing point below that of NaCl brine.

BRIEF DESCRIPTION OF THE SEVERAL VIEWS OF THE DRAWING

Figure 14:
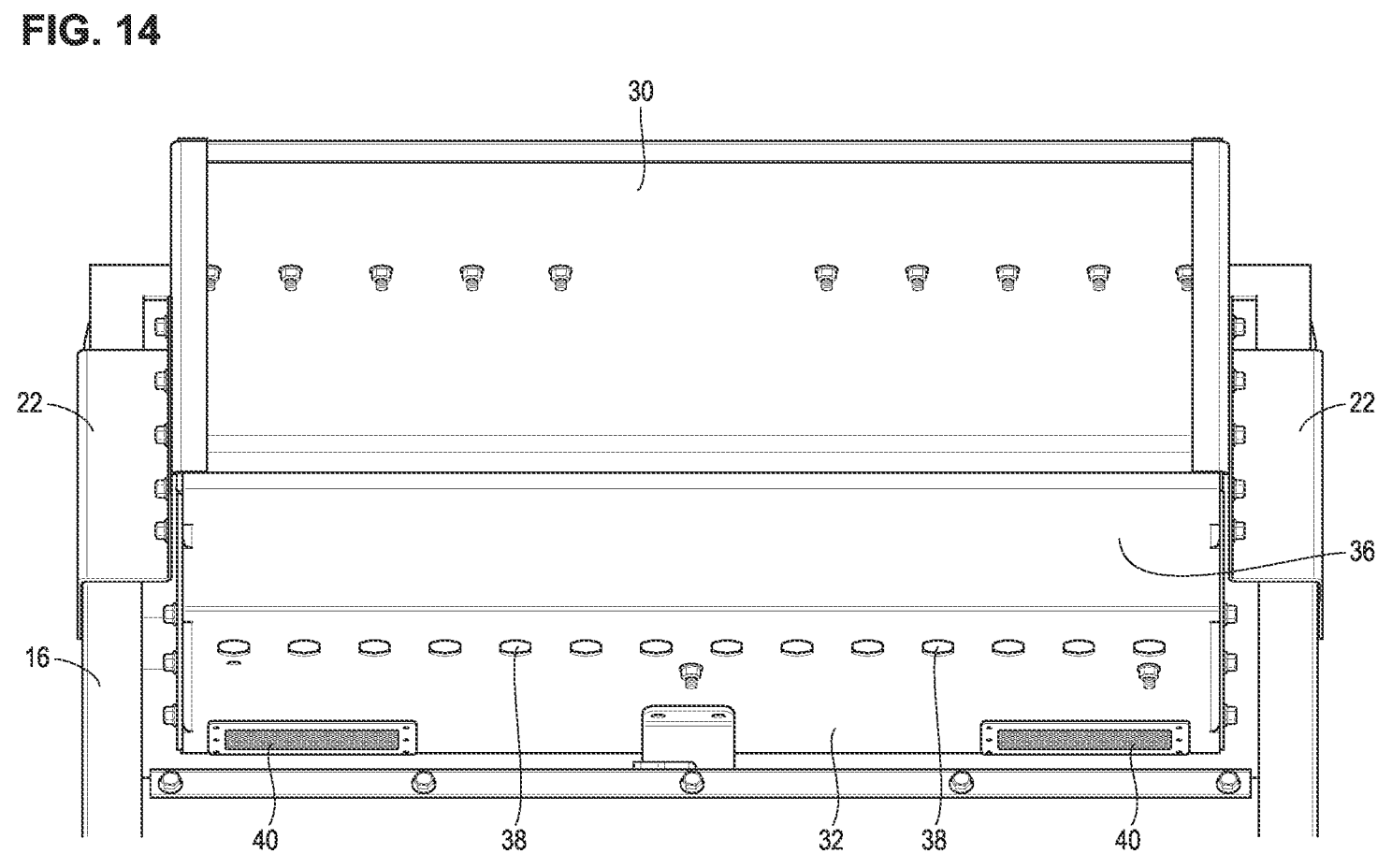

FIG. 14 is a rear top perspective view of the mounted mix vessel of FIG. 11;

DETAILED DESCRIPTION OF THE PREFERRED EMBODIMENTS

Figure 1:
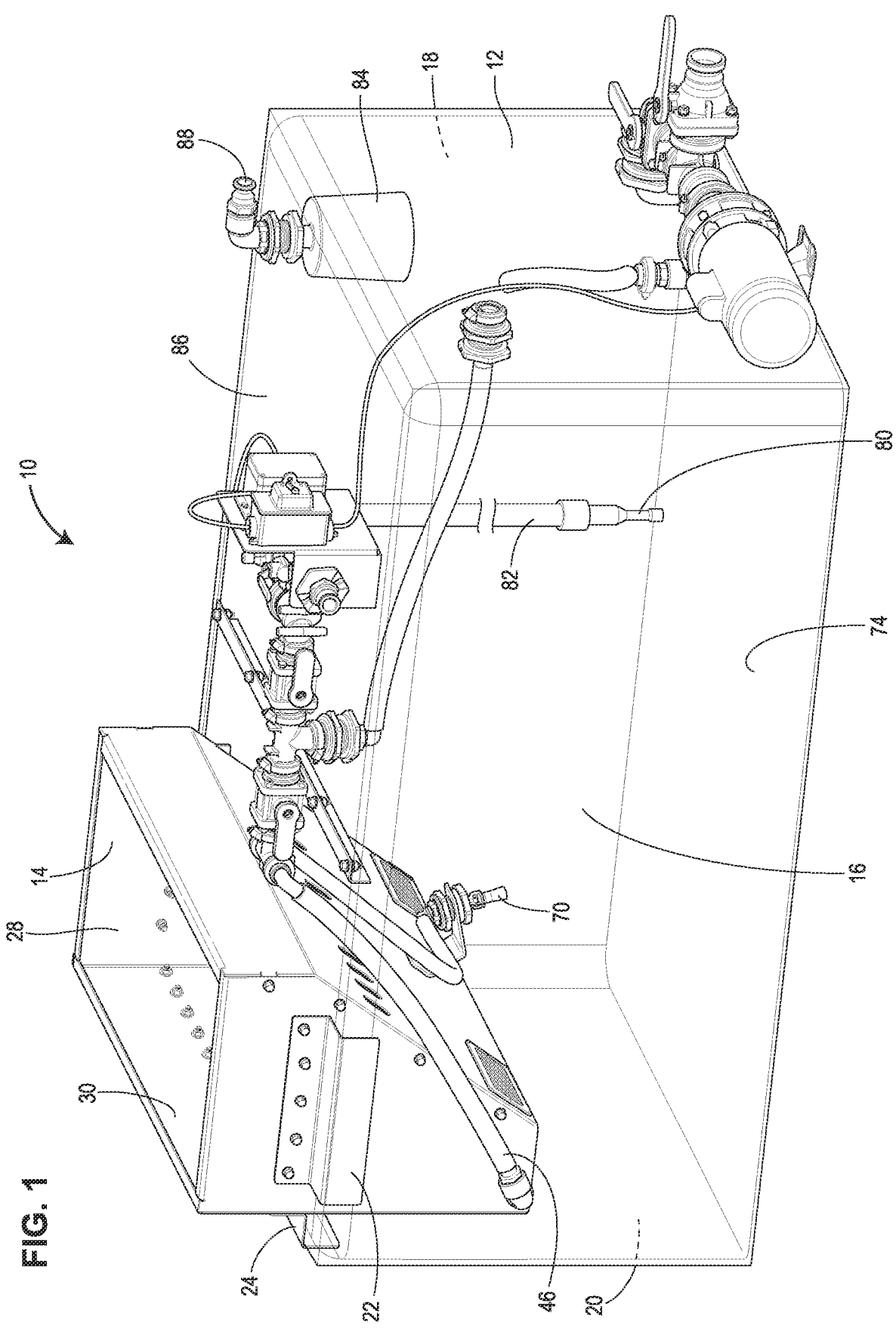
FIG. 1 is a rear, right, top perspective view of a small-batch brine plant of the present disclosure, with the walls and lid of a batch vessel of the small-batch brine plant transparent for purposes of illustration only.

With reference to the drawing figures, a small-batch salt brine plant 10 of the present disclosure includes a batch vessel 12 and a mixing vessel 14. The mixing vessel 14 may be removably mounted on an upper rim or lip of each of the sidewalls 16, 18 and front wall 20 of the batch vessel 12, such as with side mounting brackets 22 and one or more front mounting brackets 24, which may be bolted or welded to mixing vessel sidewalls 26, 28 and a mixing vessel front wall 30. By way of example only, the mixing vessel 14 may be made of stainless sheet metal, and when mounted on the batch vessel 12, is partially submerged when the batch vessel 12 is at or near capacity. Provided the relative size of the mixing vessel 14 to the sidewalls 16, 18 and front wall 20 permit, the mixing vessel 14 may selectively rest on the outside frame or body of the batch vessel 14 without the need to secure the mixing vessel 14 to the batch vessel 12 with bolts, latches, or straps, and without the need to weld or otherwise permanently attach the mixing vessel 14 to the batch vessel 12. The batch vessel 12, by way of example only, may be a rotomolded polyurethane tank.

Figure 5:
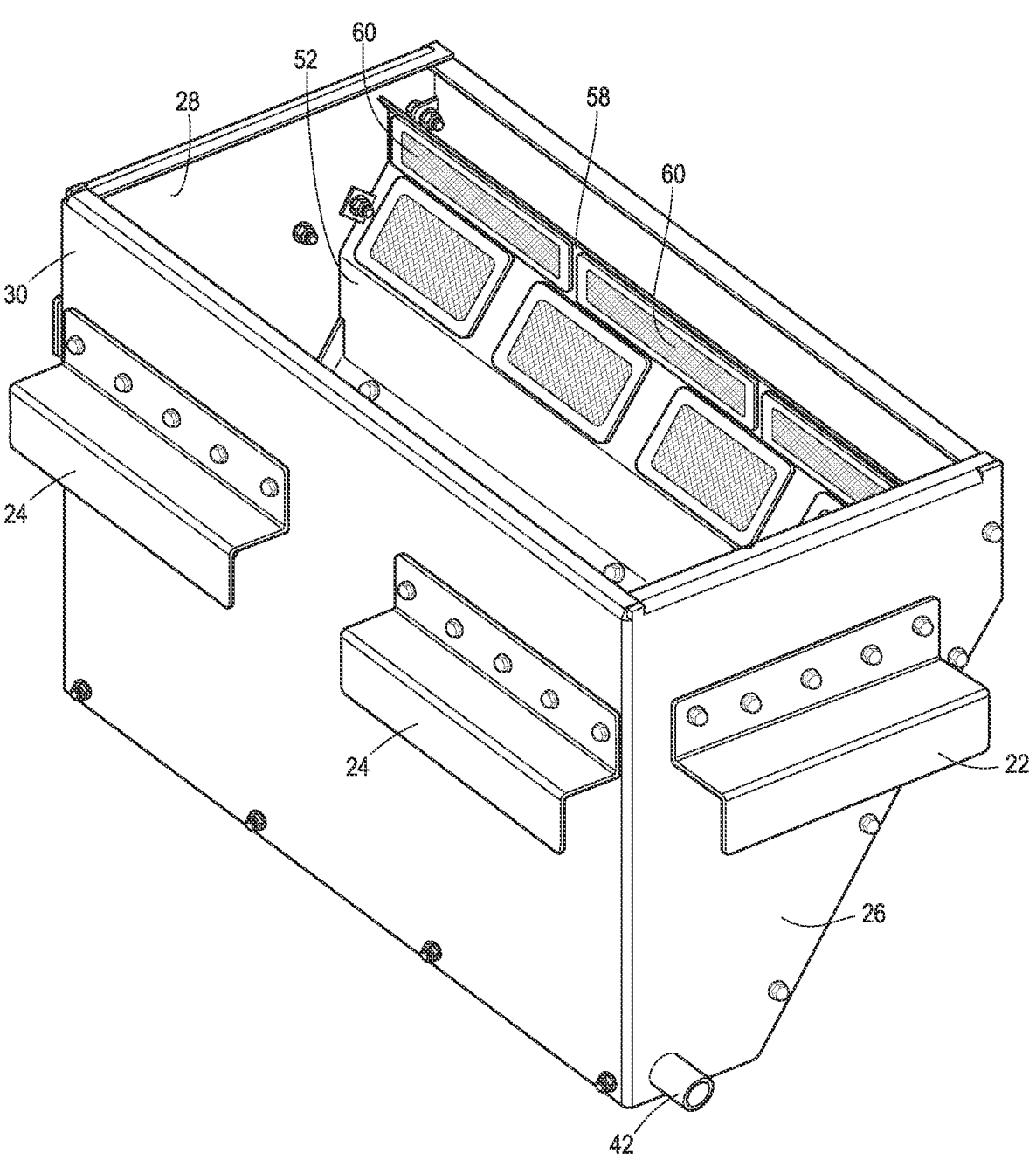
FIG. 5 is a top, right, front perspective view of a mix vessel of the small-batch brine plant of FIG. 1.
Figure 6:
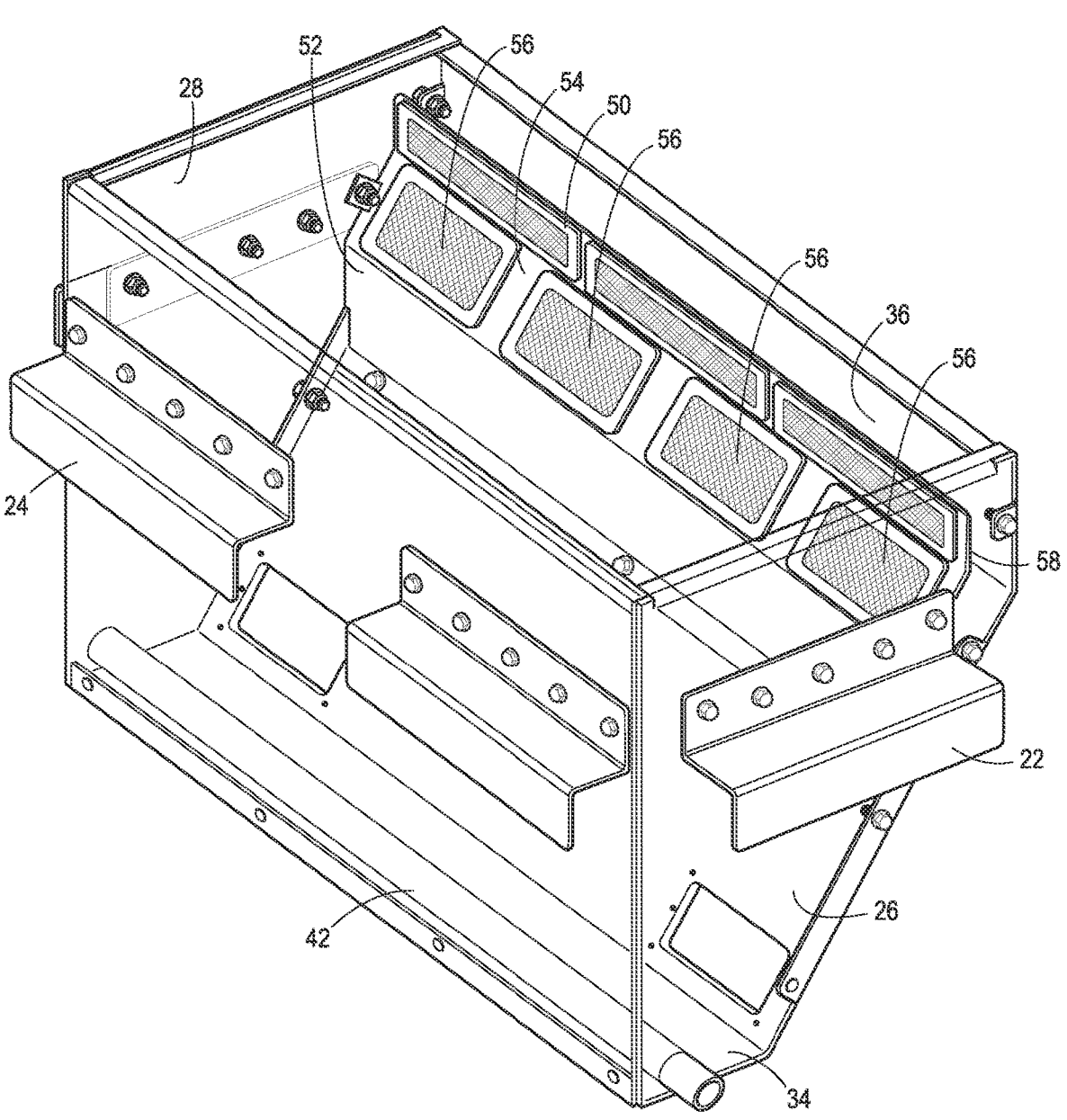
FIG. 6 is a top, right, front perspective view of the mix vessel of FIG. 5, with the walls of the mix vessel transparent and the lower filter screens removed for purposes of illustration only.
Figure 7:
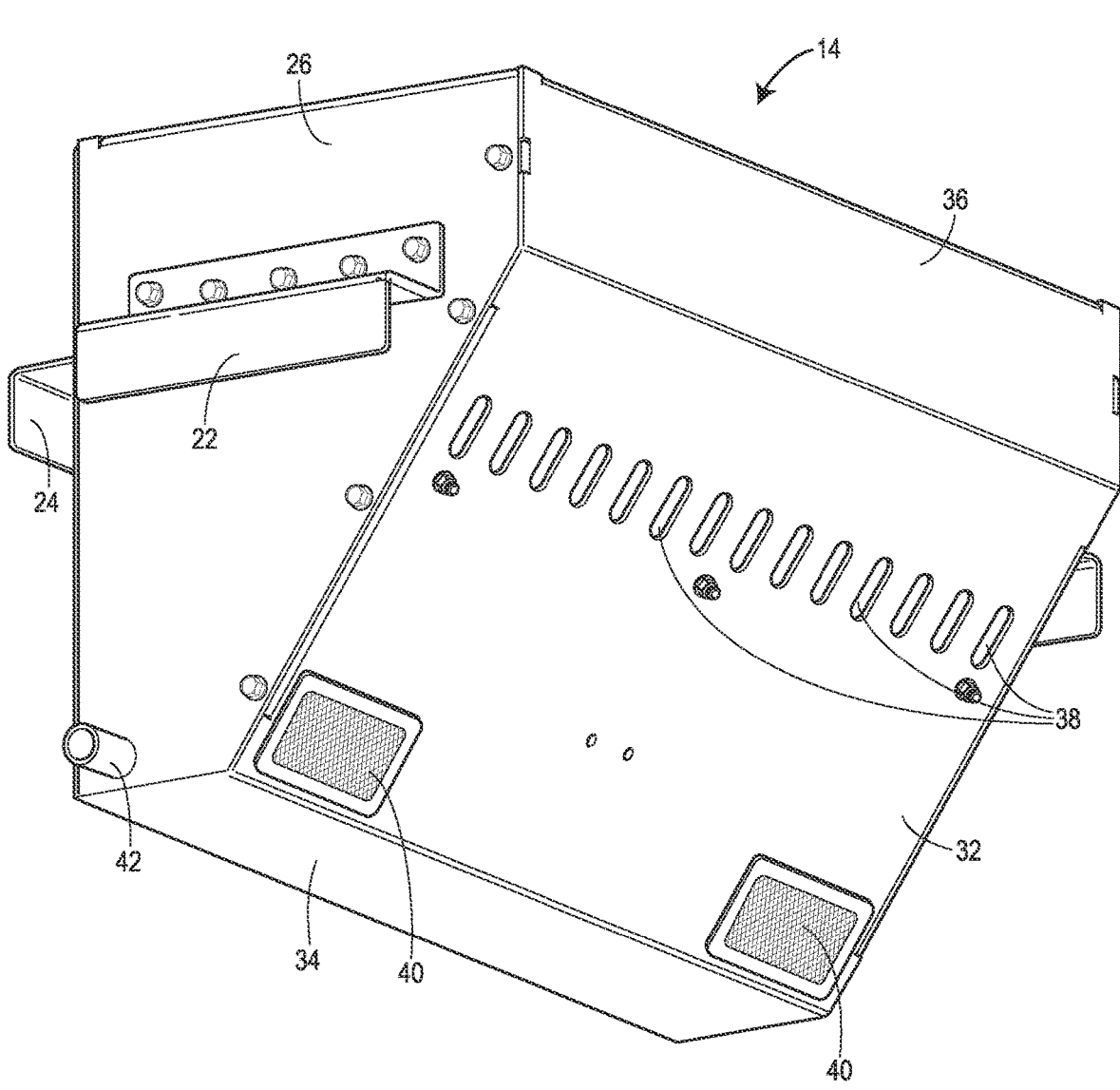
FIG. 7 is a rear, right, bottom perspective view of the mix vessel of FIG. 5.

As best illustrated in FIGS. 5-7, the mixing vessel 14 is further provided with a sloped rear wall 32 that extends from a relatively narrow floor 34 to a vertical rear panel 36 toward a top of the mixing vessel 14. The sloped rear wall 32 includes a plurality of slots 38, through which salt brine solution may flow from the mixing vessel 14 into the batch vessel 12. The sloped rear wall 32 is further provided with at least one and preferably two relief screens 40 just above the floor 34 of the mixing vessel 14. It is found that in the absence of any relief screens near a base of the mixing vessel 14, a pressure differential between the mixing vessel and the batch vessel causes salt in the mixing vessel to lift, which has a tendency to reduce contact time between salt and water, effectively increasing the time to reach the eutectic point of 23.3% saturation. When such relief screens 40 are utilized along the base of the sloped rear wall 32 of the mixing vessel 14, this pressure differential is equalized, and as a result, gravity tends to keep undissolved salt at the bottom of the mixing vessel 14. These relief screens 40 not only are helpful to equalize any pressure differential between the mixing vessel 14 in the batch vessel 12, but when the batch vessel 12 and mixing vessel 14 are pumped out, such as for cleaning or other maintenance, the relief screens 40 allow any brine remaining near the bottom of the mixing vessel 14 to drain into the batch vessel 12, further facilitating removal of the mixing vessel 14 from the batch vessel 12.

The mixing vessel 14 is also provided with an agitation pipe 42 that extends through at least one of the mixing vessel sidewalls 26, 28 and along the floor 34 of the mixing vessel 14. As can be appreciated in FIGS. 8 and 9, the agitation pipe 42 includes a plurality of agitation nozzles or apertures 44 along its length. These agitation nozzles or apertures 44 of the agitation pipe 42 are preferably directed toward the sloped rear wall 32 of the mixing vessel 14. When activated, water is pumped through the agitation pipe 42 and out the agitation nozzles or apertures 44 at a sufficiently high pressure to break up salt collected at the bottom of the mixing vessel 14, which serves to result in increased salinity in the production of salt brine. The location of the agitation pipe 42 along the floor 34 of the mixing vessel 14 keeps the agitation at the lowest point possible within the mixing vessel 14. With the agitation nozzles or apertures 44 directed toward the relief screens 40 at the base of the sloped rear wall 32 of the mixing vessel 14, any tendency for the relief screens 40 to become clogged with salt and other debris is minimized.

The agitation pipe 42 is in fluid communication with a water source via an agitation hose or feed line 46, which fluid communication may include a suitable manifold, one or more valves, and a pump. By way of example only, the agitation pipe 42 may be a spray bar of 1" diameter Schedule 40 stainless pipe with holes (agitation nozzles or apertures 44) positioned parallel to the floor 34 of the mixing vessel 14 (though the holes could be positioned at other angles relative to the floor 34), at a uniform spacing of 2.5" along the length of the pipe. The angle of the sloped rear wall 32 of the mixing vessel 14 cooperates with the fluid spray from the agitation nozzles or apertures 44 of the agitation bar 42 to keep a maximum amount of agitation focused on the undissolved salt at the base or floor 34 of the mixing vessel 14, resulting in faster mixing times.

The mixing vessel 14 is further provided with a divider/filtration wall 50 that serves as a salt blocker, effectively dividing the mixing vessel 14 into a main mixing part, between the front wall 30 of the mixing vessel 14 and a front side of the divider/filtration wall 50 (which region is further defined by the portion of the sloped rear wall 32 of the mixing vessel 14 below the divider/filtration wall 50 and the two mixing vessel sidewalls 26, 28), into which solid salt is provided and water is introduced, and a filtered part between a rear side of the divider/filtration wall 50 and a front side of the vertical rear panel 36 of the mixing vessel 14. This filtered part or region of the mixing vessel 14 is further defined by a portion of the sloped rear wall 32 of the mixing vessel 14 above the bottom of the divider/filtration wall 50 and portions of the mixing vessel sidewalls 26, 28 rearward of the divider/filtration wall 50.

Figure 8:
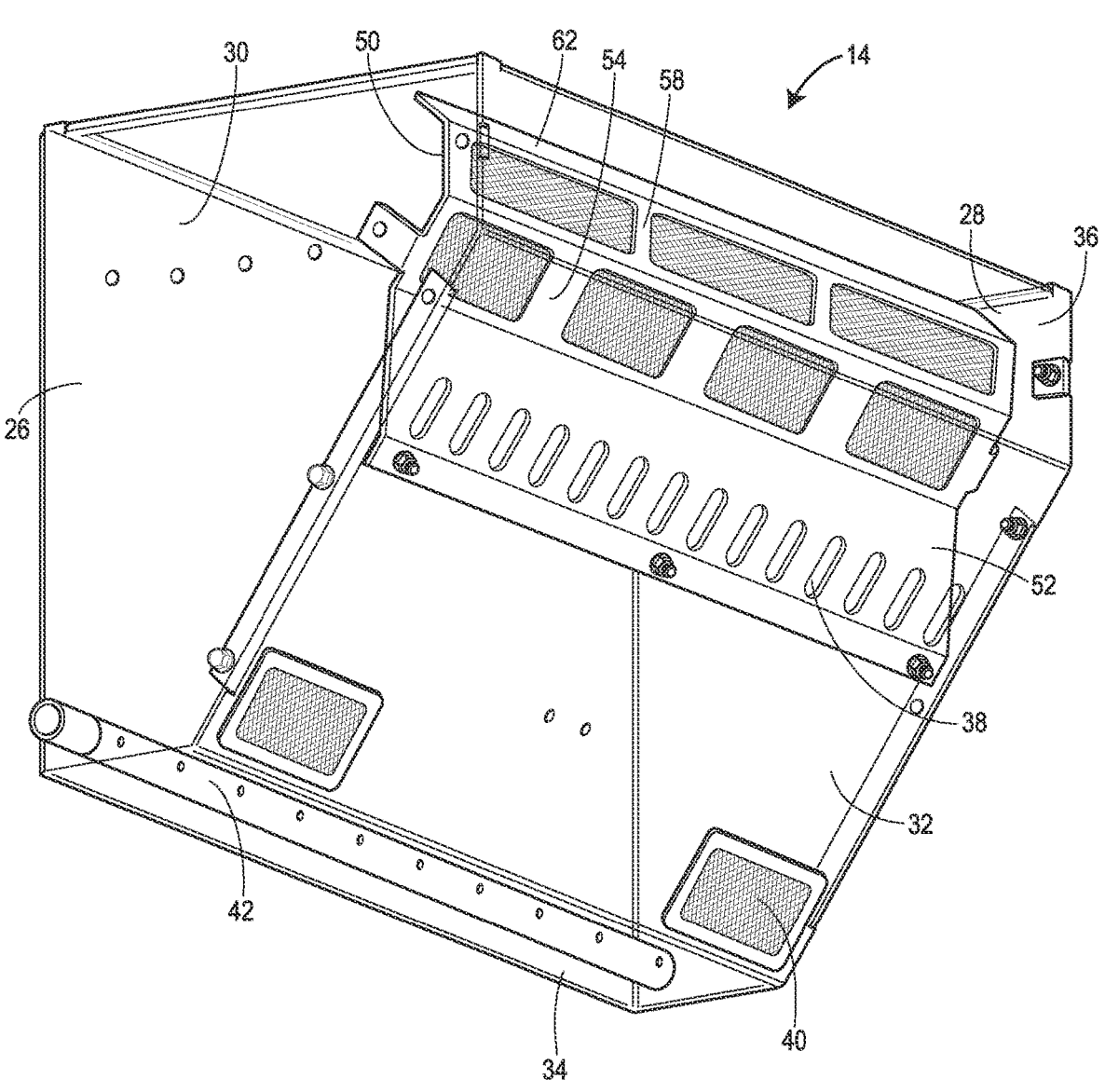
FIG. 8 is a rear, right, top perspective view of the mix vessel of FIG. 5 with an agitation pipe provided at a bottom thereof, with the walls of the mix vessel transparent for purposes of illustration only.
Figure 9:
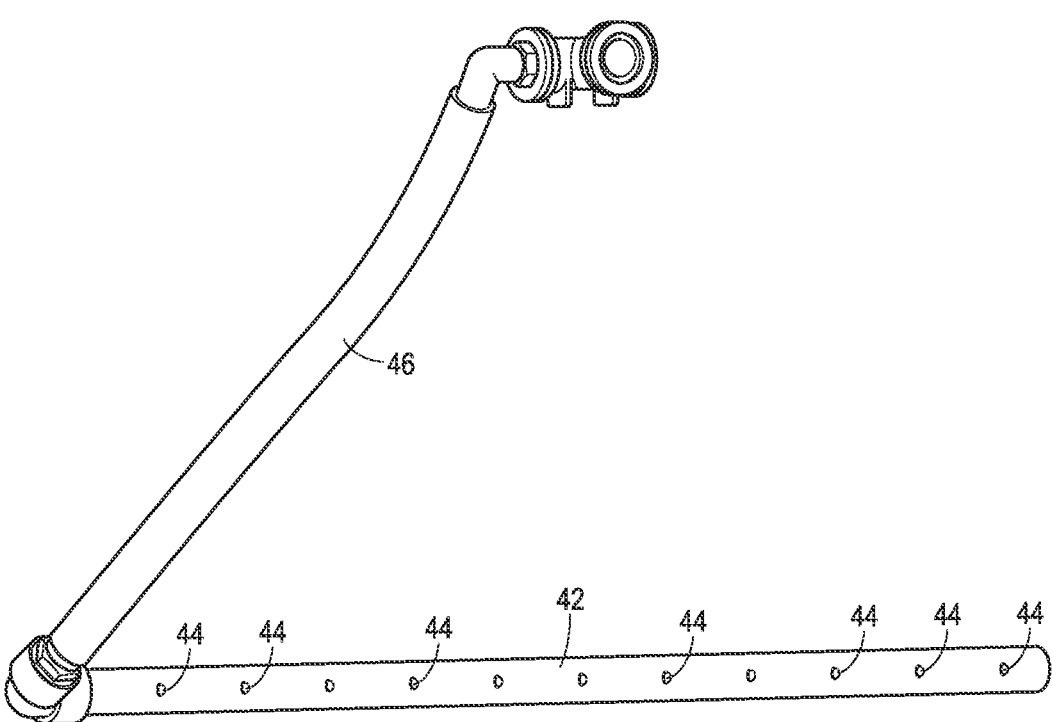
FIG. 9 is a right, rear, top perspective view of the agitation pipe of FIG. 8, and its associated agitation feed line, which agitation tube is deployed at the bottom of the mix vessel of FIG. 5
Figure 10:
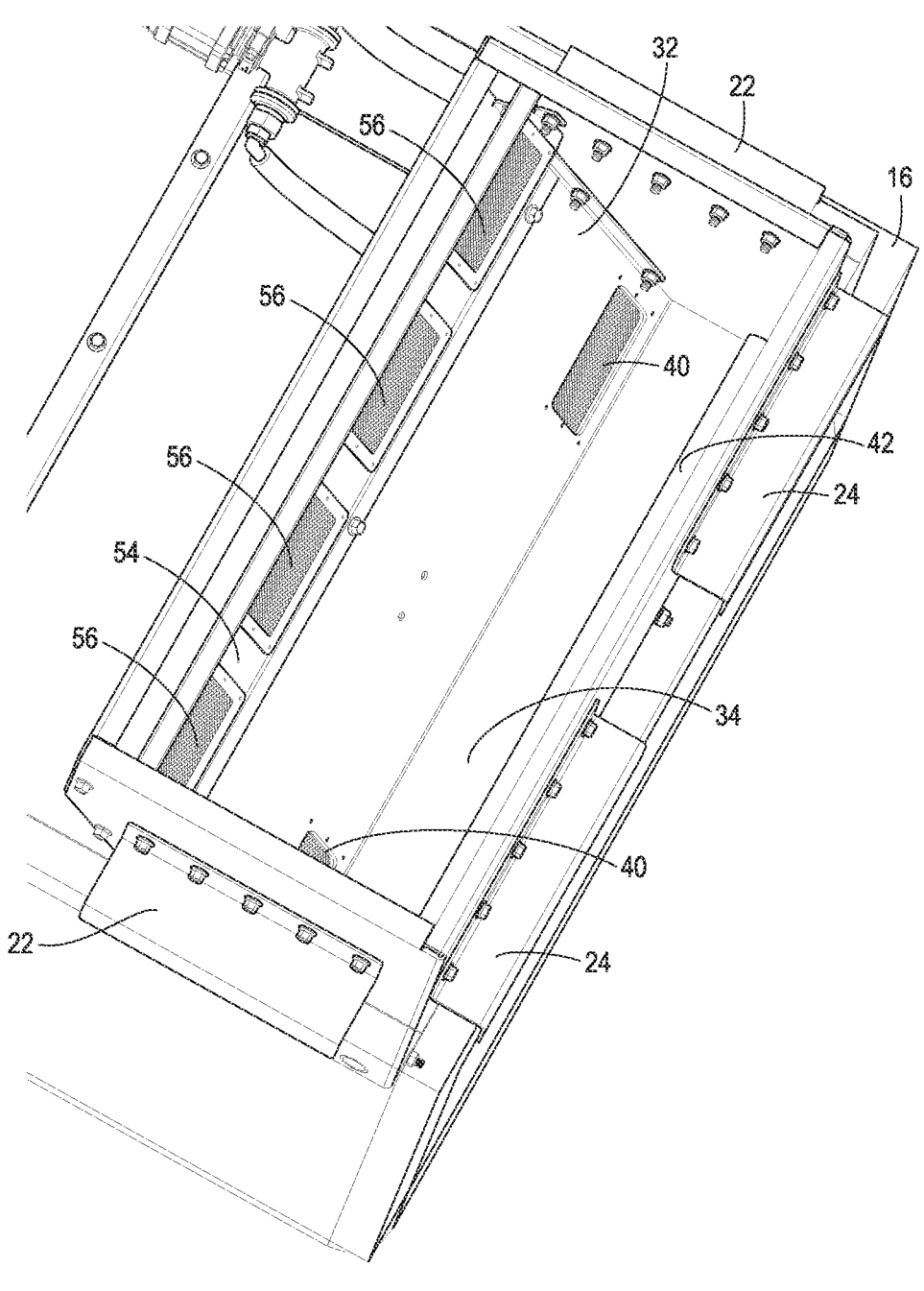
FIG. 10 is a top view of the mounted mix vessel of FIG. 9.
Figure 11:
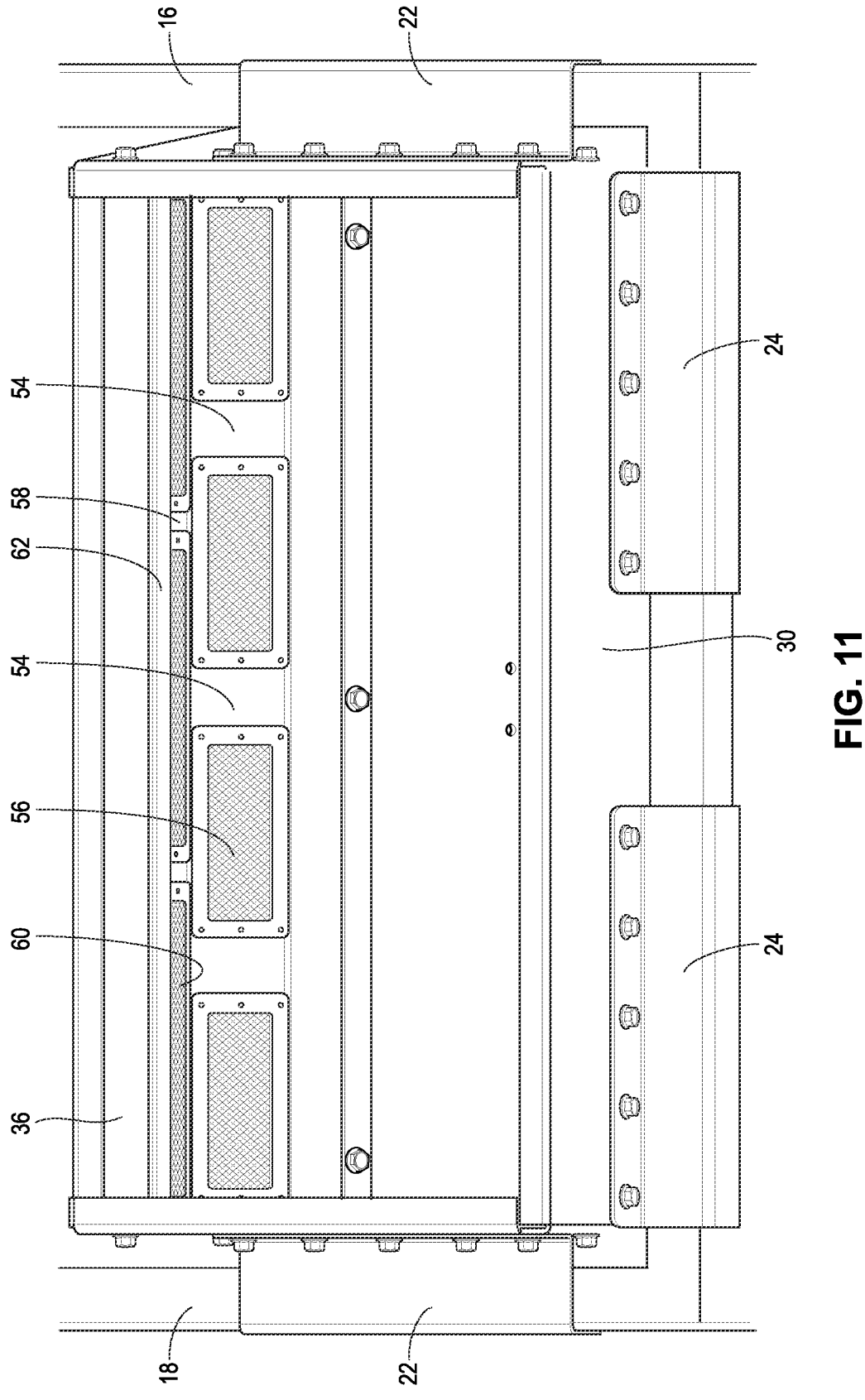
FIG. 11 is a top perspective view of the mix vessel of FIG. 5, mounted on the batch vessel.
Figure 12:
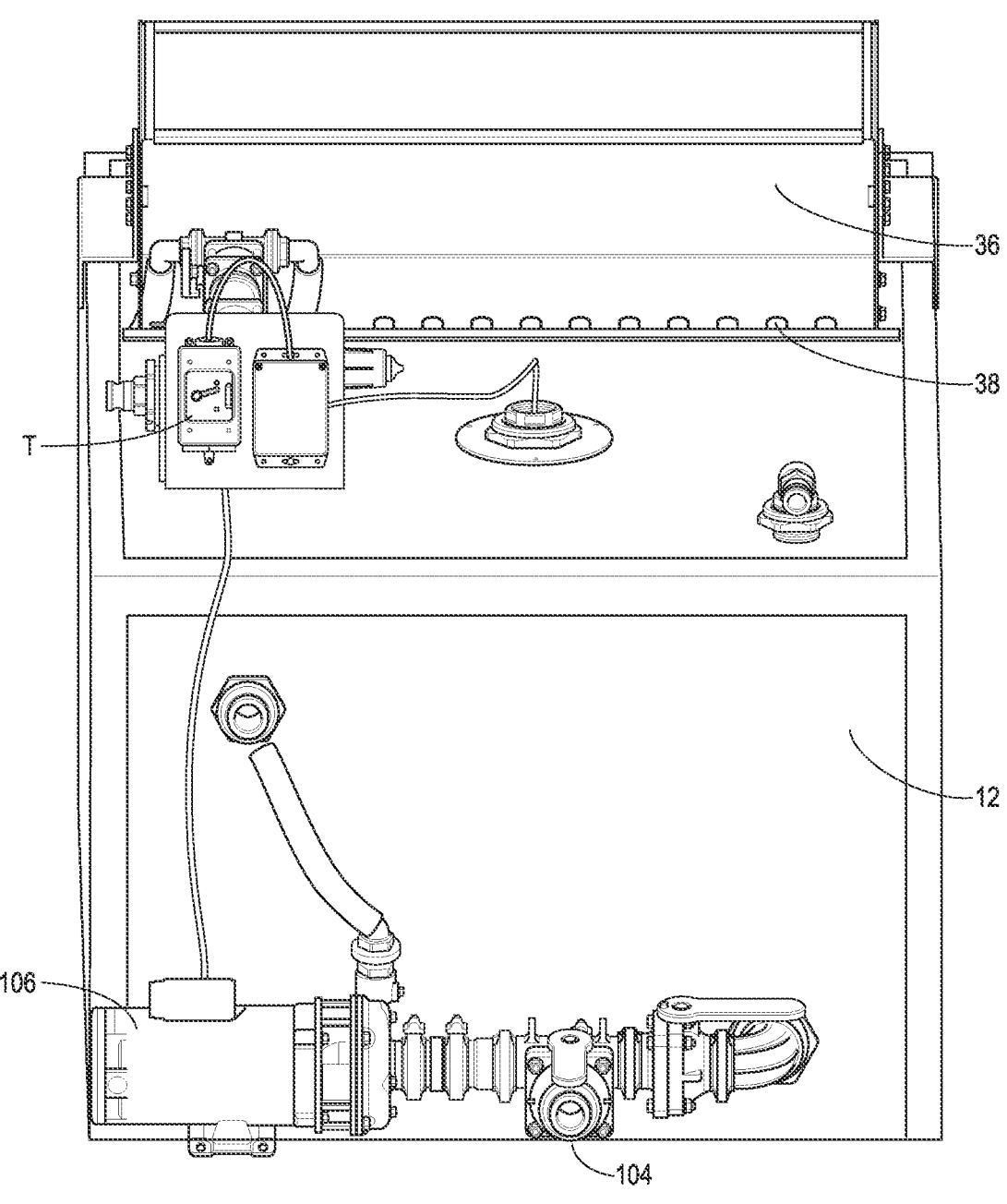
FIG. 12 is a rear, top perspective view of the small-batch brine plant of FIG. 1.
Figure 13:
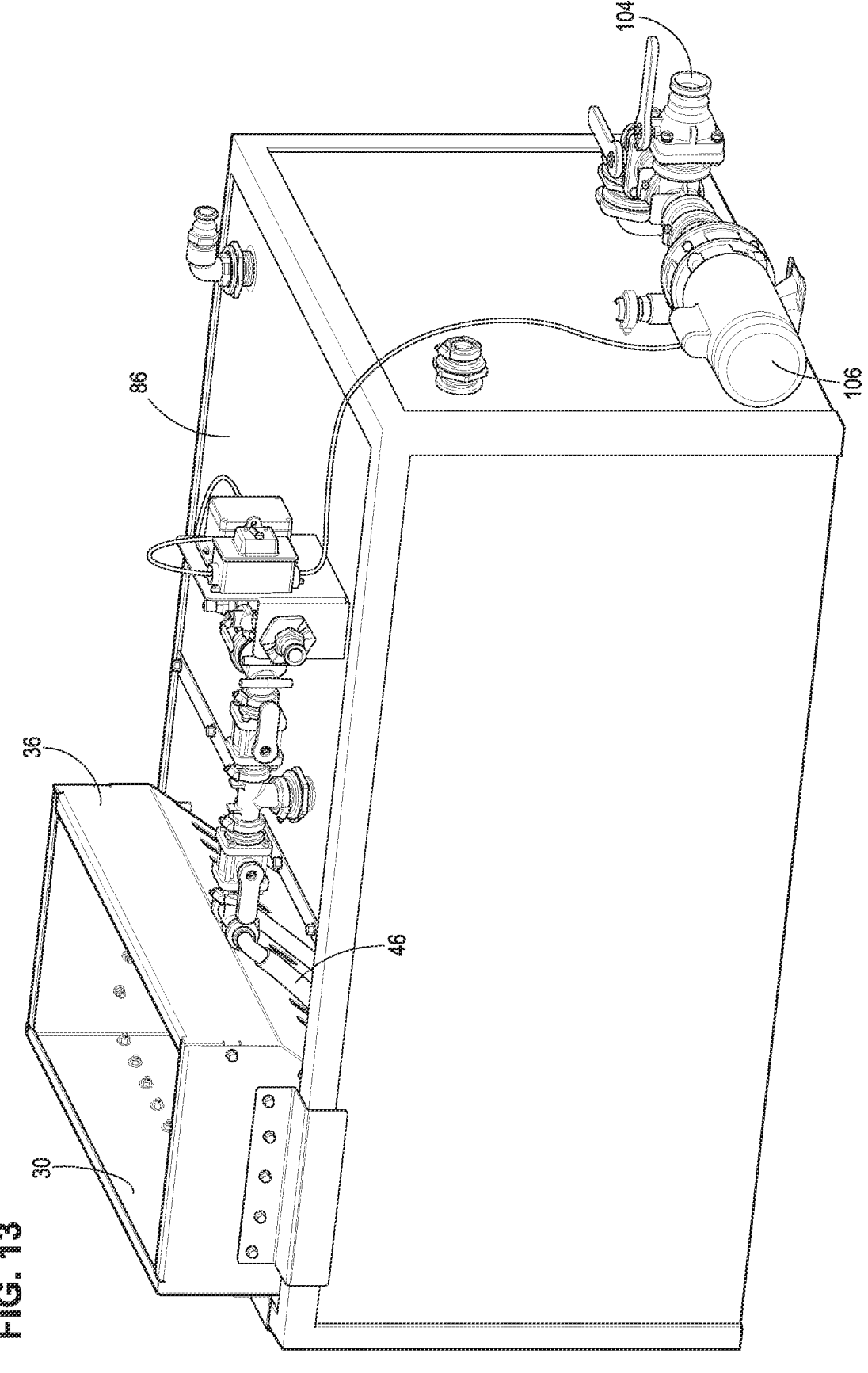
FIG. 13 is a right, rear, top perspective view of the small-batch brine plant of FIG. 1.
Figure 15:
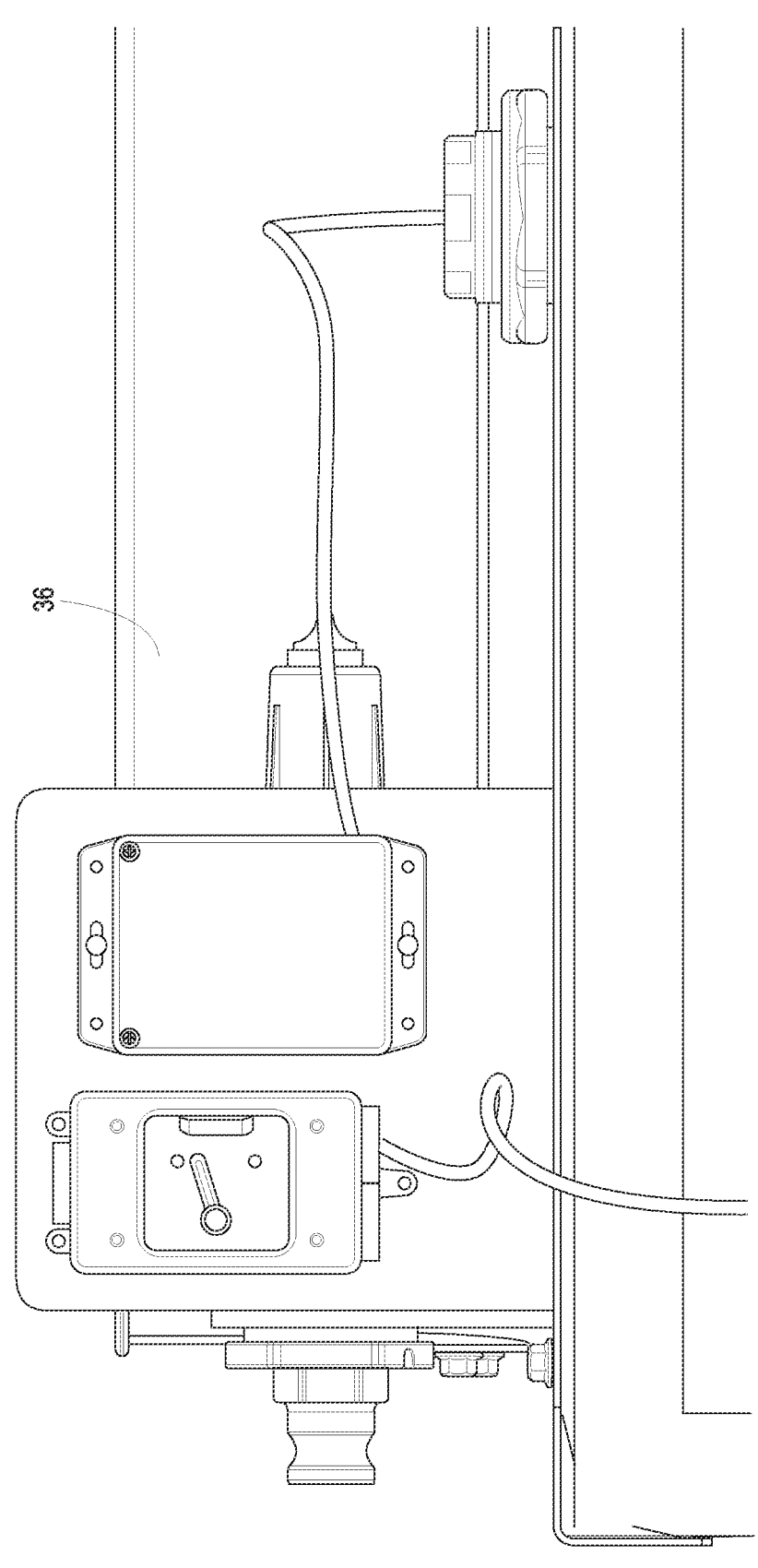
FIG. 15 is an enlarged rear view of the small-batch brine plant of FIG. 1, illustrating the main power supply and toggle.
Figure 17:
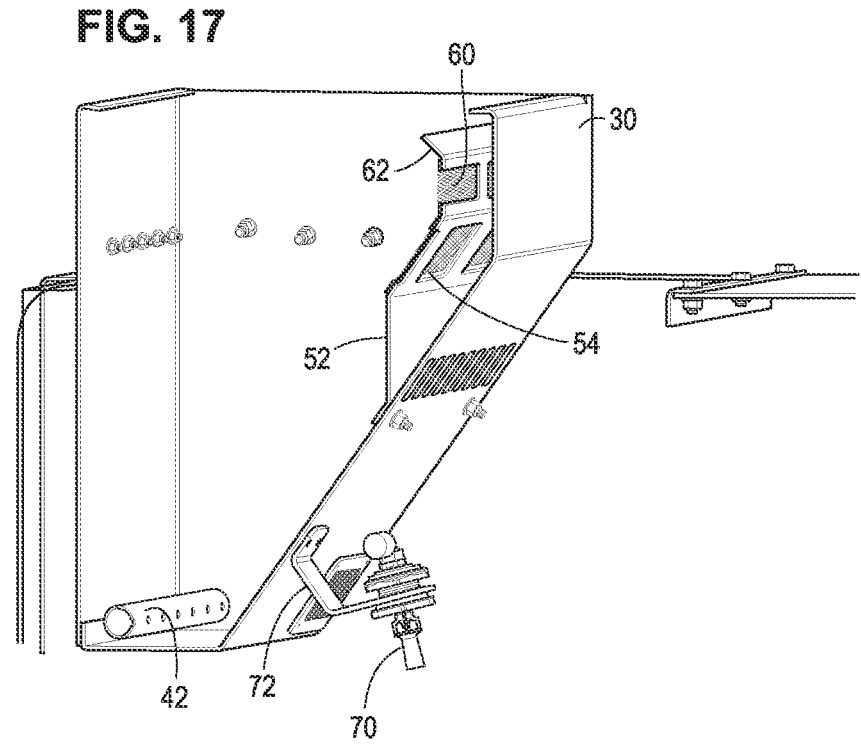
FIG. 17 is a right, rear perspective cross-sectional view taken along lines 17,18-17,18 of FIG. 16.
Figure 18:
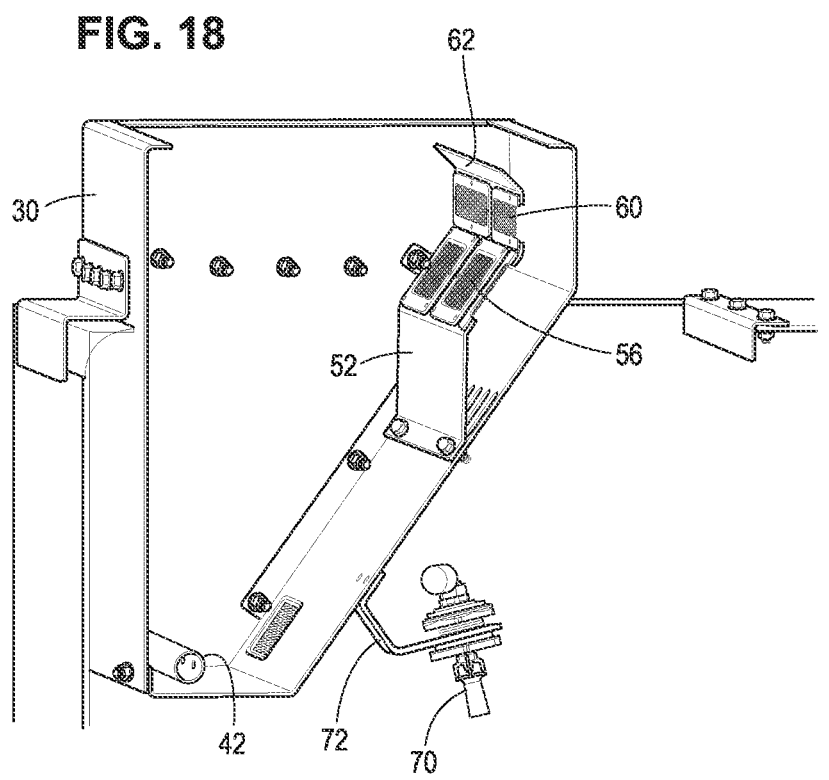
FIG. 18 is a right, front perspective cross-sectional view taken along lines 17,18-17,18 of FIG. 16.

The divider/filtration wall 50 spans the entire length of the mixing vessel 14, from one mixing vessel sidewall 26 to the other mixing vessel sidewall 28, and has a generally serpentine cross-section, as best seen in FIGS. 8, 17, and 18. A lower portion 52 of the divider/filtration wall 50 extends vertically from the sloped rear wall 32 of the mixing vessel 14. A first intermediate portion 54 of the divider/filtration wall 50 is sloped rearwardly toward the rear wall 32 of the mixing vessel 14. This first intermediate portion 54 is provided with one or more filter screens 56 extending along the length of the mixing vessel 14. A second intermediate portion 58 extends vertically from a top of the first intermediate portion 54, parallel to the vertical rear panel 36 of the mixing vessel 14. This second intermediate portion 58 preferably also includes filter screens 60 along its length. An uppermost portion 62 of the divider/filtration wall 50 is sloped back toward the front wall 30 of the mixing vessel 14. The upper portion 62 serves as an overflow divider, in case the filter screens 56, 60 become blocked to such an extent that the level of fluid on the front side of the divider/filtration wall 50 rises above the filter screens 60, and even with the upper portion 62. Should the liquid level rise to a level breaching over the upper portion 62, the serpentine cross-sectional shape of the divider/filtration wall 50 advantageously provides a path for the liquid to gently cascade over the divider/filtration wall 50, in a waterfall effect, maintaining a relatively laminar flow as the liquid spills into the rear, filtered part of the mixing vessel 14 between the divider/filtration wall 50 and the sloped rear wall 32 and vertical rear panel 36. In this manner, the divider/filtration wall 50 can serve as a diffuser.

An eductor nozzle 70 is secured via an eductor mount 72 to the sloped rear wall 32 of the mixing vessel 14. The eductor nozzle 70 is generally downwardly directed toward a floor 74 of the batch vessel 12, and has the ability to introduce high flow volume agitation in a lower portion of the batch vessel 12, helping to achieve a more homogenous distribution of salt brine within the batch vessel 12. In the absence of an eductor nozzle, it is found that there can be approximately 8-10% variation in salinity concentrations, or more, through a given water column in the batch vessel 12. Wide variations in salinity concentrations are problematic, as they lead to uncertainty when measuring salinity manually with a hydrometer. It is not uncommon with conventional salt brine-making systems to measure salinity of only 11-15% near the top of a water column and 25%, past the eutectic point of 23.3%, near the bottom of the same water column. When using the present system, with the eductor nozzle 70, it is found that significantly more reliable salinity measurements can be taken, even at a variety of depths.

Figure 2:
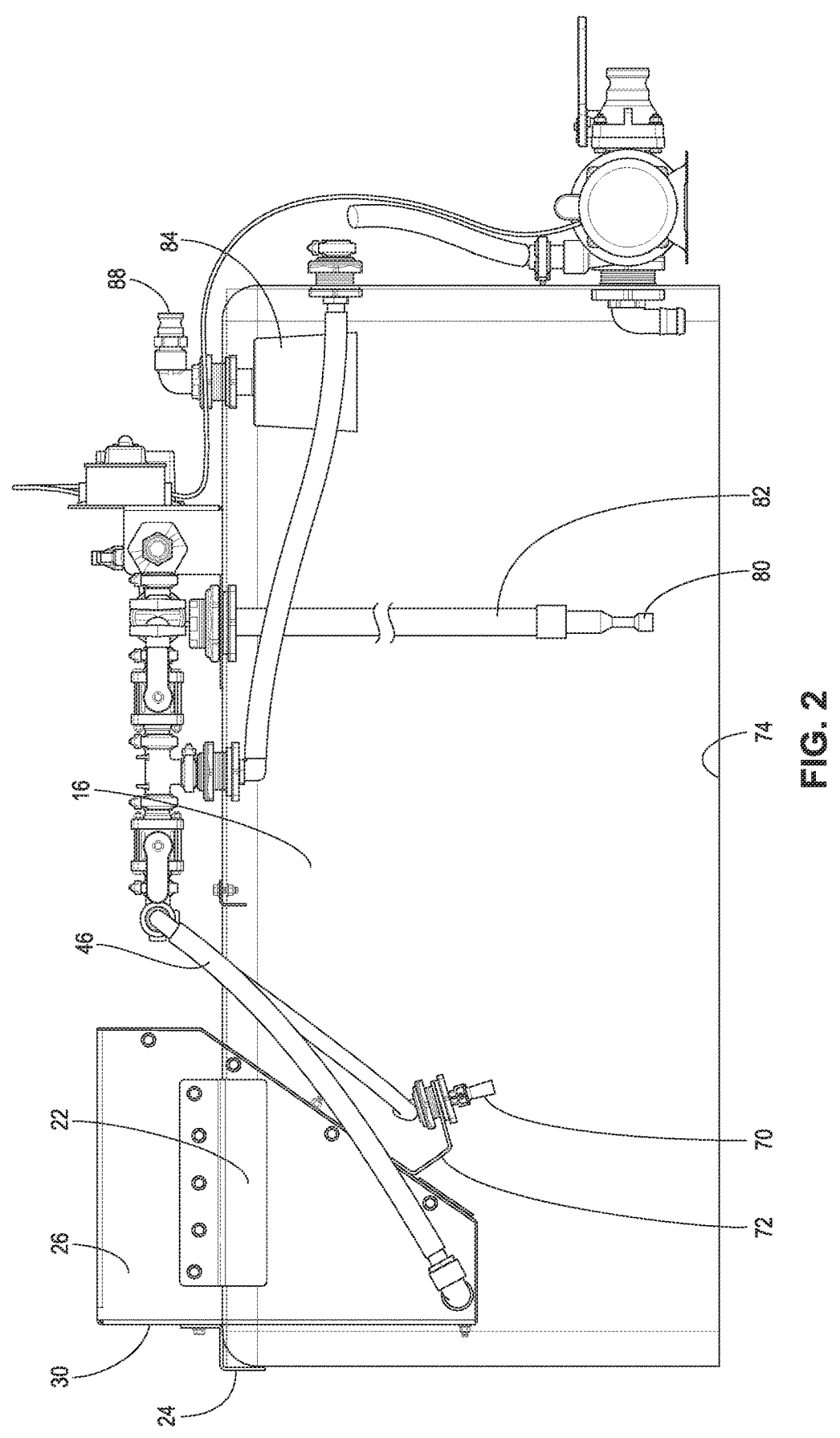
FIG. 2 is a right side view of the small-batch brine plant of FIG. 1.
Figure 3:
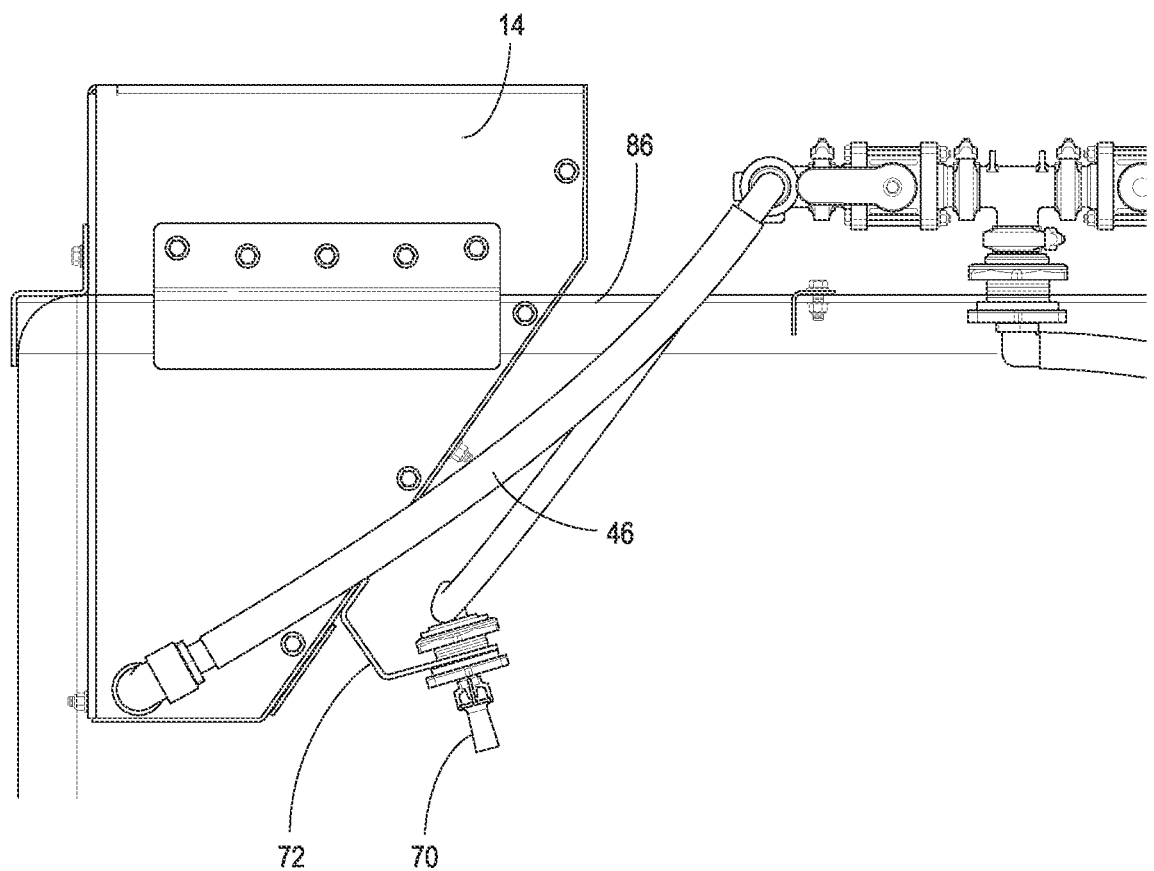
FIG. 3 is an enlarged right side view of the small-batch brine plant of FIG. 1.
Figure 4:
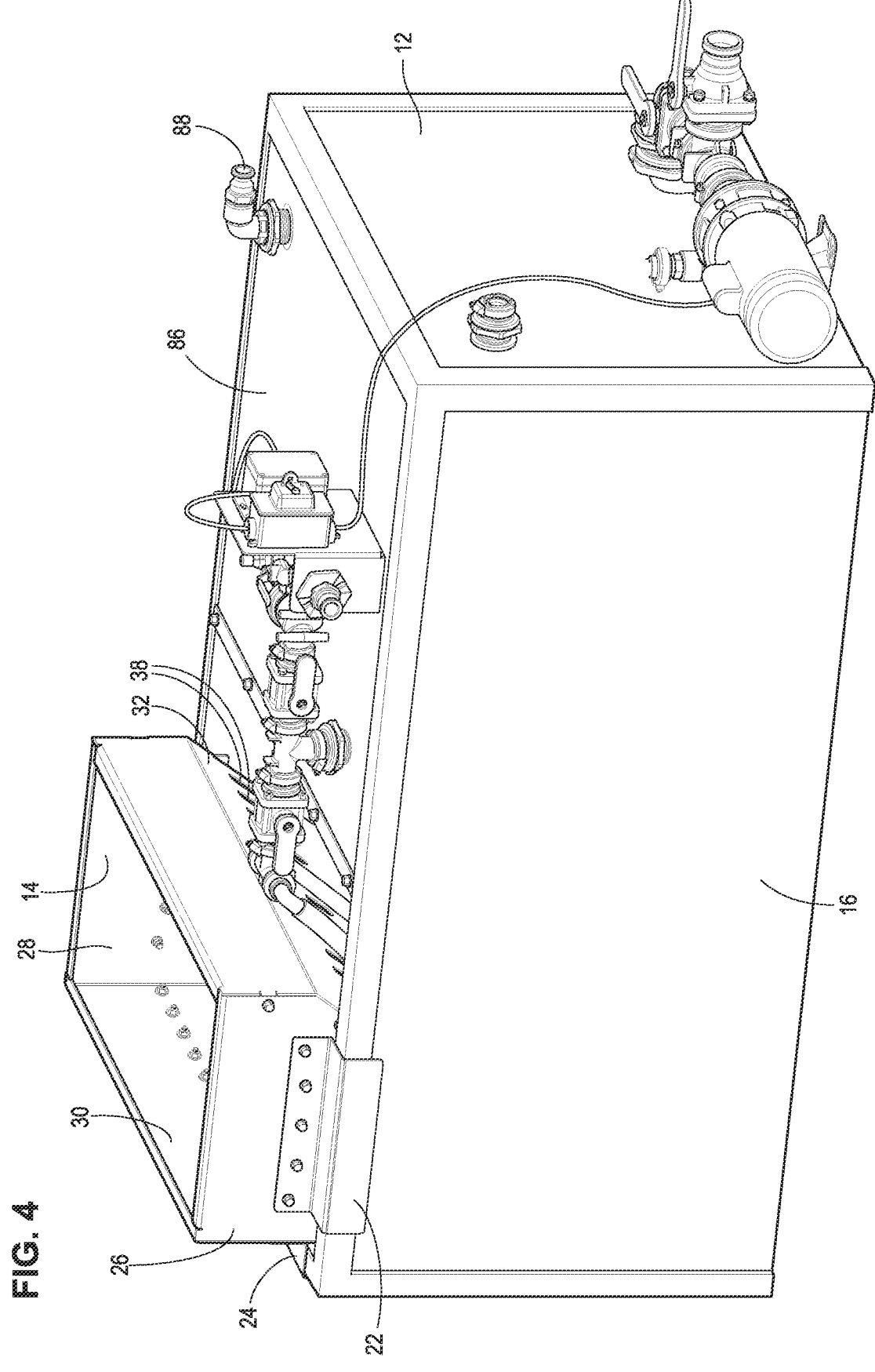
FIG. 4 is a right, rear, top perspective view of the small-batch brine plant of FIG. 1.
Figure 16:
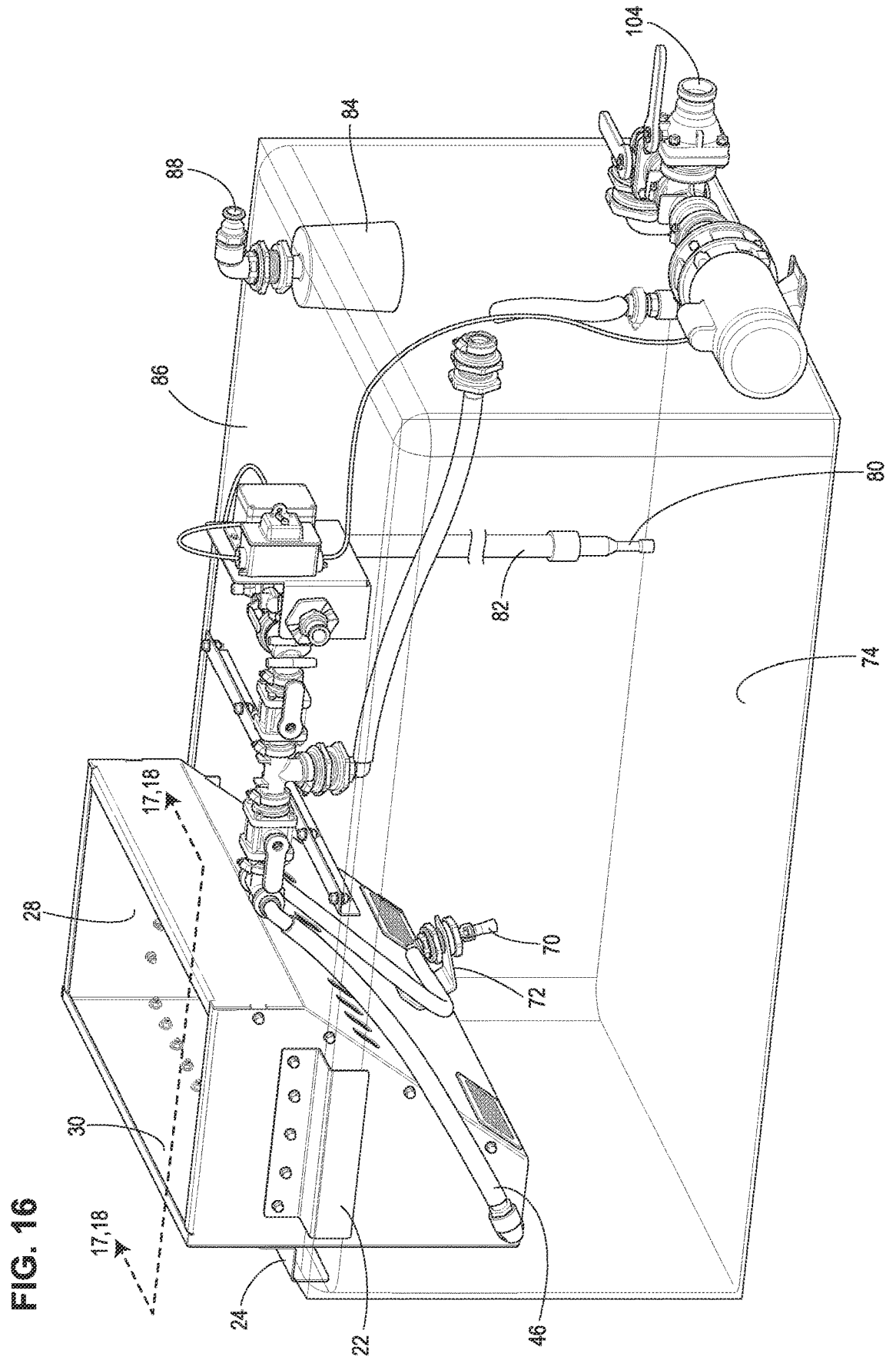
FIG. 16 is a right, rear, top perspective view of the small-batch brine plant of FIG. 1, the walls of the mix vessel being transparent for purposes of illustration only.

A wireless salinity sensor 80 is mounted at the base of a sensor mounting post 82 within the batch vessel 12. The sensor mounting post 82 is illustrated in FIGS. 1, 2, and 16 with a broken-away portion along its length, indicating that the wireless salinity sensor 80 may be mounted at different depths within the batch vessel 12, as the system of the present disclosure provides sufficient distribution of salt brine within the batch vessel 12 that salinity concentrations are more uniform throughout a given water column within the batch vessel 12. The wireless salinity sensor 80 may be used in communication with a computer program or a computer application (app) stored on a computer-readable medium and operating on a computer, smartphone, tablet, or the like, to provide an indication to an operator of real-time salinity measurements.

Figure 19:
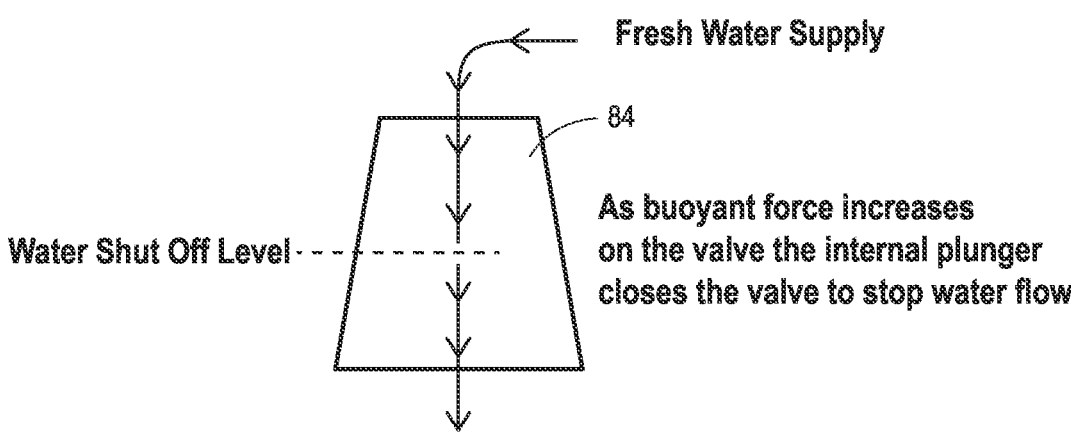
FIG. 19 is a schematic diagram illustrating the operation of a float valve/fresh water supply of the small-batch brine plant of the present disclosure.

As illustrated in FIGS. 1, 2, and 16, a float valve 84 may also be provided. The float pump may be mounted to an underside of a lid 86 of the batch vessel 12. An exemplary mode of operation of the float valve 84 is illustrated schematically in FIG. 19. A fresh water supply is provided to the batch vessel 12 through an intake 88 that traverses the lid 86 of the batch vessel. As buoyant force increases on the float valve 84 as the level within the batch vessel 12 reaches a desired shut-off level, an internal plunger (not shown) of the float valve 84 closes the float valve 84, stopping the flow of water from the intake 88.

Figure 20:
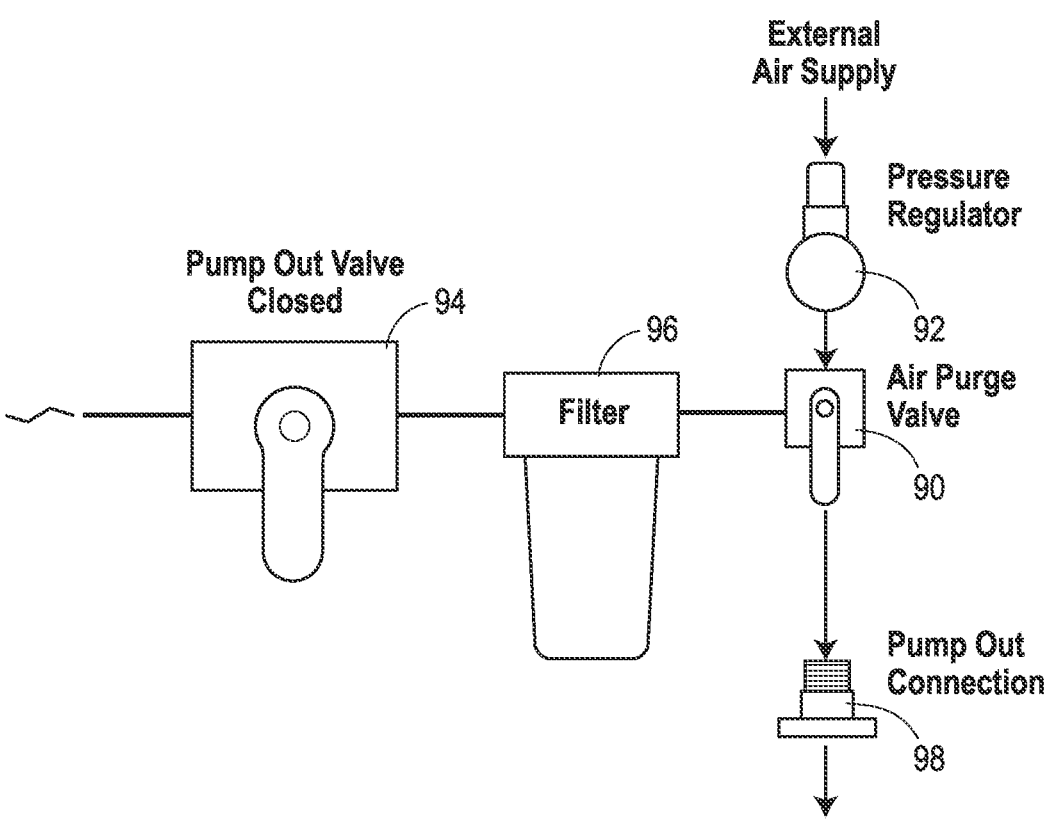
FIG. 20 is a schematic diagram illustrating the operation of an air purge feature of the small-batch brine plant of the present disclosure.

As illustrated schematically in FIG. 20, an air purge valve 90 may be provided in communication with other components of the fluid control system or manifold of the small-batch brine plant of the present disclosure, such as a pressure regulator 92, a pump out valve 94, a filter 96, and a pump out connection 98. The air purge valve 70 advantageously reduces spillage of water when components are disconnected, such as when the mixing vessel 14 is removed from the batch vessel 12 for cleaning or maintenance.

Figure 21:
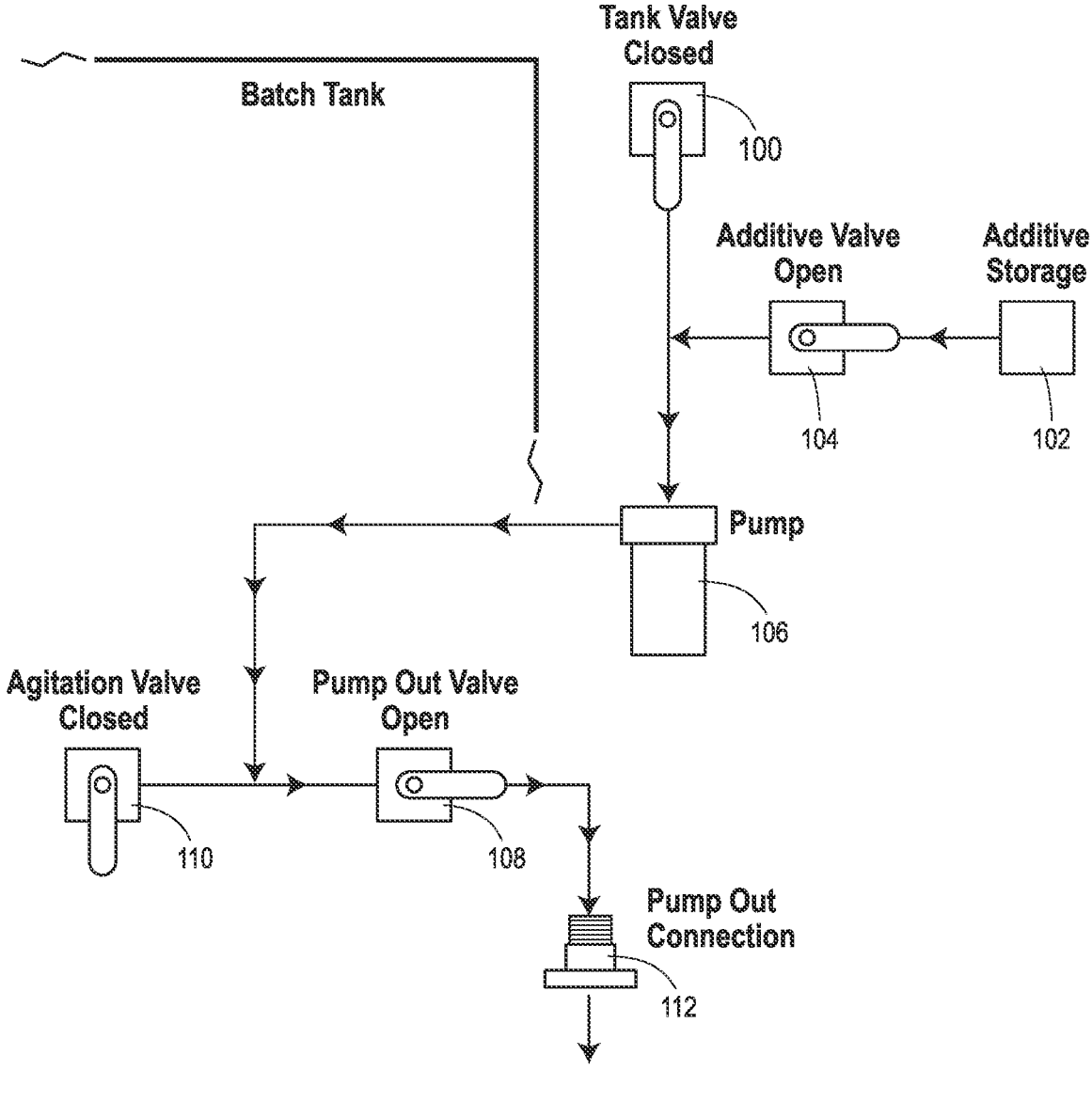
FIG. 21 is a schematic diagram illustrating additive induction, by which additives may be introduced in an in-line manner to brine made using the small-batch brine plant of the present disclosure.
Figure 22:
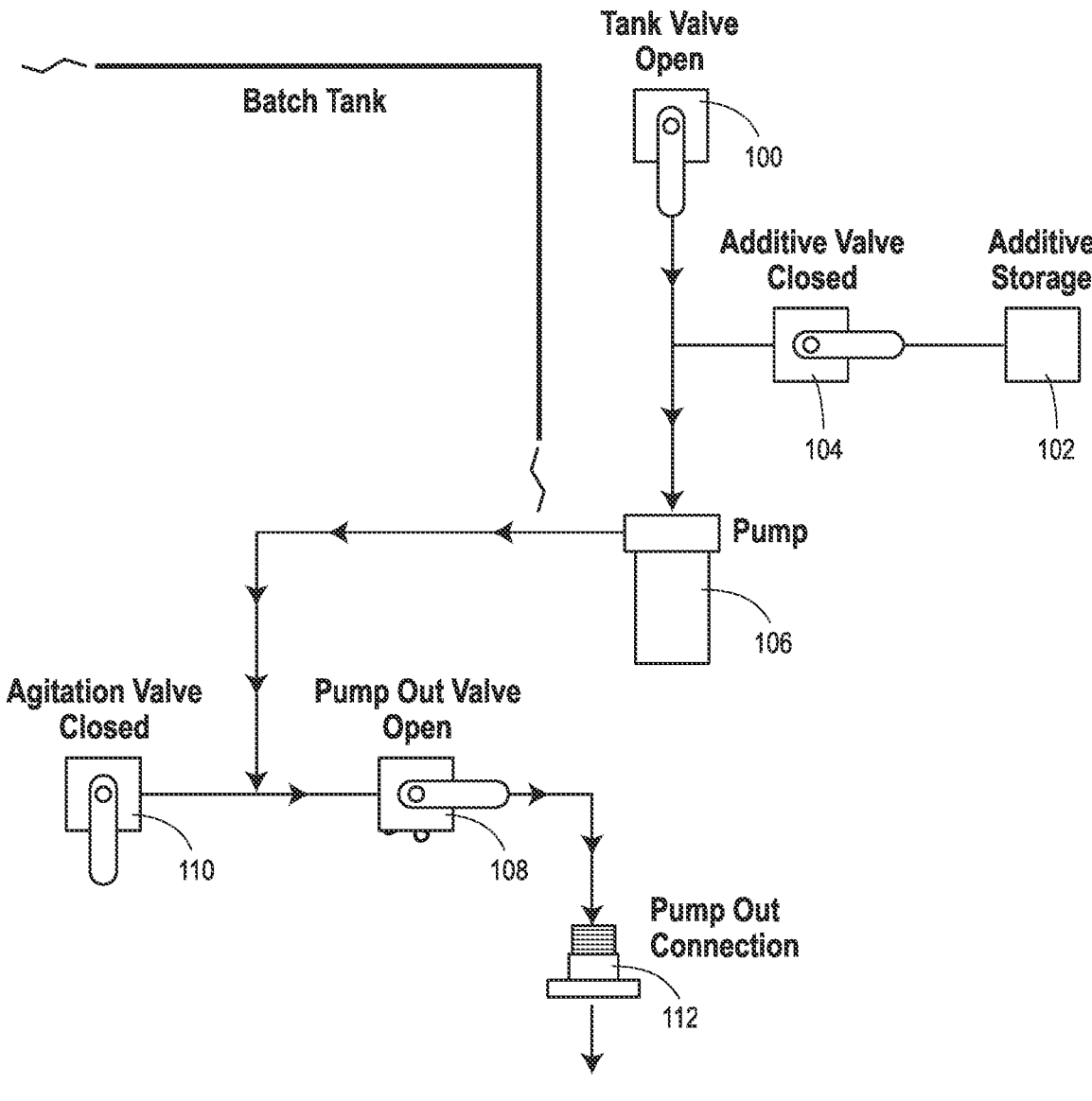
FIG. 22 is a schematic diagram illustrating the manner in which the control valves of the small-batch brine plant of the present disclosure may be positioned to pump brine out of the batch vessel, to an external storage tank or to a tank of a truck.

It is common, particularly when producing salt brine for use in extremely cold temperatures, to introduce additives to brine made with NaCl, such as magnesium chloride (MgCl) or calcium chloride (CaCl), as such additives, and others, can advantageously further lower the freezing point of the mixture. The small-batch brine plant 10 can accommodate in-line induction of such additives from an external additive storage supply tank 102 via an additive valve 104. A tank valve 100, pump 106, pump out valve 108, an agitation valve 110 (which may be in communication with the agitation pipe 40 and/or the eductor nozzle 70), and a pump out connection 112 can be provided in a fluid circuit, as schematically illustrated in FIGS. 21 and 22, facilitating entraining additives from the additive storage supply tank 102 to the salt brine collected in the batch tank 12, to then be pumped out, for example, to a storage container or a truck.

Figure 23:
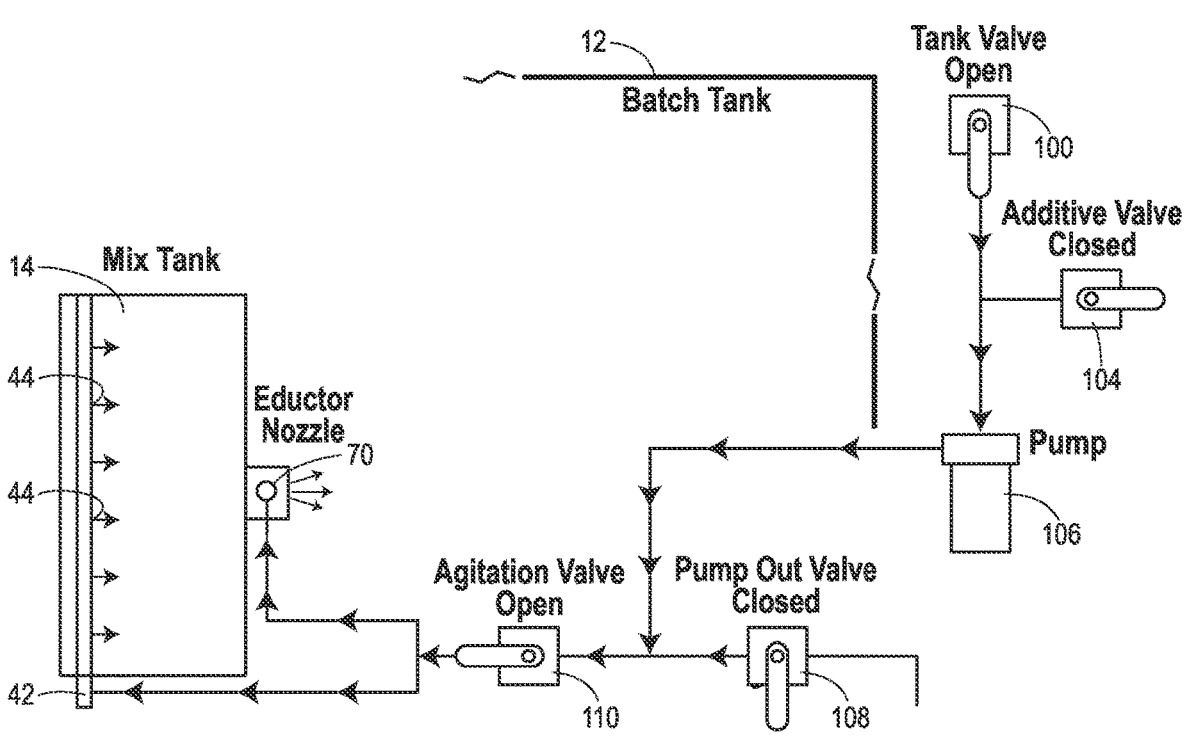
FIG. 23 is a schematic diagram illustrating a preferred manner of operation of the small-batch brine plant of the present disclosure.

FIG. 23 provides a schematic illustration of the positioning of the various valves and other components, namely the tank valve 100 in an open position, the additive valve in a closed position, the agitation valve 110 in an open position (supplying water to both the agitation pipe 42 and the eductor nozzle 70), and a pump out valve in a closed position, suitable for making brine using the small-batch brine plant of the present disclosure. The valve manifold is preferably arranged in such a manner that any component or portion of the system can be selectively isolated via operation of the valves, without destabilizing pressure within the system.

The system of the present disclosure provides a small footprint and can produce a sufficient volume of salt brine in a relatively short amount of time for a variety of use cases. By way of example only, the batch vessel 12 may have a 300 gallon capacity. The entire system can be operated with minimal power requirements, such as with a closed vein centrifugal 120V/110 A pump 106 and compatible motor controlled at a power control station T, and non-industrial or light-duty water supply, such as a garden hose. The mixing vessel 12 and batch vessel 14 are also of a sufficiently low height that they may be hand loaded without the need for large equipment to handle bulk salt.

In use, salt or other solids, such as those useful for making deicing material, is added to the front portion of the mixing vessel 14, forwardly of the divider/filtration wall 50, then water is introduced. As the salt or other solid (typically granular) deicing product is dissolved by the flow of solution, the salt level steadily lowers. A dry hopper effect is realized, as the mixing vessel 14 is able to self-balance with the filter mechanism provided by the various filter screens in the mixing vessel 14, permitting much of the mixing tank 14 to remain dry while mixing.

While various embodiments have been described herein, it will be understood that variations may be made that are still considered within the scope of the appended claims. While the system is described as being suitable for making salt brine, the teachings of the present disclosure can be applied to other uses, particularly ones in which it is desired to dissolve a solid substance into a liquid.

What is claimed is:

1. A system for producing a homogeneously-mixed solution, comprising:
   a batch vessel;
   a mixing vessel supported on and extending into the batch vessel, the mixing vessel comprising a front wall, a rear wall, a pair of opposing sidewalls, and a divider/filtration wall separating the mixing vessel into a first mixing portion and a second filtered portion, the rear wall of the mixing vessel including one or more slots to permit fluid to transfer from the second filtered portion into the batch vessel, the rear wall of the mixing vessel being sloped in a rearward direction from a floor of the mixing vessel.

2. The system of claim 1, the divider/filtration wall having one or more mesh screens therein.

3. The system of claim 1, the rear wall of the mixing vessel having one or more mesh screens in a lower portion thereof.

4. The system of claim 1, further comprising a wireless salinity sensor suspended within the batch vessel.

5. The system of claim 1, further comprising a float valve provided in the batch vessel, the float valve in communication with a fluid source and configured to interrupt flow of fluid from the fluid source into the batch vessel upon a fluid level within the batch vessel rising to a predetermined level.

6. A system for producing a homogeneously-mixed solution, comprising:
   a batch vessel;
   a mixing vessel supported on and extending into the batch vessel, the mixing vessel comprising a front wall, a rear wall, a pair of opposing sidewalls, and a divider/filtration wall separating the mixing vessel into a first mixing portion and a second filtered portion, the rear wall of the mixing vessel including one or more slots to permit fluid to transfer from the second filtered portion into the batch vessel, the divider/filtration wall having a serpentine cross-section.

7. A system for producing a homogeneously-mixed solution, comprising:
   a batch vessel;
   a mixing vessel supported on and extending into the batch vessel, the mixing vessel comprising a front wall, a rear wall, a pair of opposing sidewalls, and a divider/filtration wall separating the mixing vessel into a first mixing portion and a second filtered portion, the rear wall of the mixing vessel including one or more slots to permit fluid to transfer from the second filtered portion into the batch vessel;

the mixing vessel provided with an agitation pipe extending along a floor thereof, the agitation pipe including a plurality of nozzles to supply pressurized fluid into a lower portion of the mixing vessel;

an eductor nozzle secured via an eductor mount to a rear side of the rear wall of the mixing vessel, the eductor nozzle sharing a fluid supply with the agitation pipe; and a manifold and valve circuit placing the eductor nozzle and the agitation pipe in selective fluid communication with a pump.

8. The system of claim 7, and the eductor nozzle having an outlet generally directed toward a floor of the batch vessel.

9. The system of claim 8, further comprising an air purge valve and an air supply in fluid communication with the manifold and valve circuit.

10. The system of claim 7, further comprising an additive valve to selectively place additive supplied by an additive storage tank into fluid communication with solution collected in the batch vessel as the solution is pumped out of the system.

11. The system of claim 7, wherein the nozzles of the agitation pipe are directed toward at least one of the rear wall of the mixing vessel and a floor of the mixing vessel.

\*   \*   \*   \*   \*